United States Patent [19]

Fraser

[11] 4,415,269
[45] Nov. 15, 1983

[54] DEVICE FOR PROVIDING A REINFORCED FOAM LINING FOR WELL BORE HOLES

[76] Inventor: Ward M. Fraser, P.O. Box 217, Harbor City, Calif. 90710

[21] Appl. No.: 245,067

[22] Filed: Apr. 28, 1981

[51] Int. Cl.³ .......................... B01F 3/08; B01F 15/02
[52] U.S. Cl. .................................. 366/132; 222/135;
366/134; 366/177; 366/182; 366/192; 422/133; 422/236
[58] Field of Search ..................... 366/29, 37, 65, 131, 366/132, 134, 160, 162, 177, 182, 192; 422/133, 236; 166/285, 309; 222/135, 136, 145

[56] References Cited

U.S. PATENT DOCUMENTS

| | | | |
|---|---|---|---|
| 2,876,935 | 3/1959 | Lindberg | 222/145 |
| 3,111,389 | 11/1963 | Hansen et al. | 366/160 X |
| 3,575,319 | 4/1971 | Safianoff | 222/145 X |
| 3,726,340 | 4/1973 | Fraser | 166/295 X |
| 3,753,554 | 8/1973 | Muller et al. | 366/177 X |
| 3,794,301 | 2/1974 | Simmonds, Jr. | 366/132 |
| 3,889,764 | 6/1975 | Jackson | 166/309 X |
| 4,074,363 | 2/1978 | Croft | 366/182 X |
| 4,276,934 | 7/1981 | Fraser | 166/309 X |

FOREIGN PATENT DOCUMENTS

| | | | |
|---|---|---|---|
| 755461 | 3/1967 | Canada | 222/145 |
| 1161140 | 1/1964 | Fed. Rep. of Germany | 366/134 |
| 1439197 | 6/1976 | United Kingdom | 366/162 |

*Primary Examiner*—Philip R. Coe
*Attorney, Agent, or Firm*—Roger A. Marrs

[57] ABSTRACT

A reinforced hardened foam lining may be constructed in a particular zone of a well such as a water well, a geothermal well, or an oil well to plug off or contain salt water intrusion or lost circulation by placing a length of perforated pipe in the desired location; placing foam generating components in a foam generating device in the length of perforated pipe; mixing the resin and catalyst (components) forming a mixture of components under pressure which fills the length of perforated pipe, flows through the perforations and fills the voids between the pipe and the side wall of the hole, then swells forming a foam and hardens. The area inside the length of perforated pipe may then be drilled out providing a strong reinforced channel.

2 Claims, 5 Drawing Figures

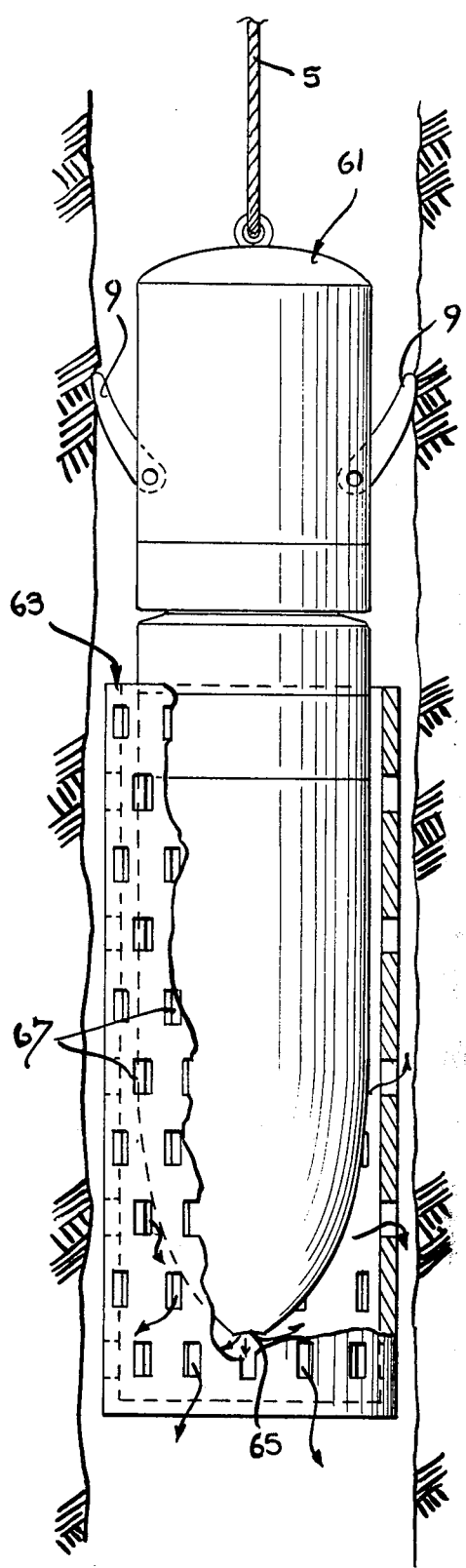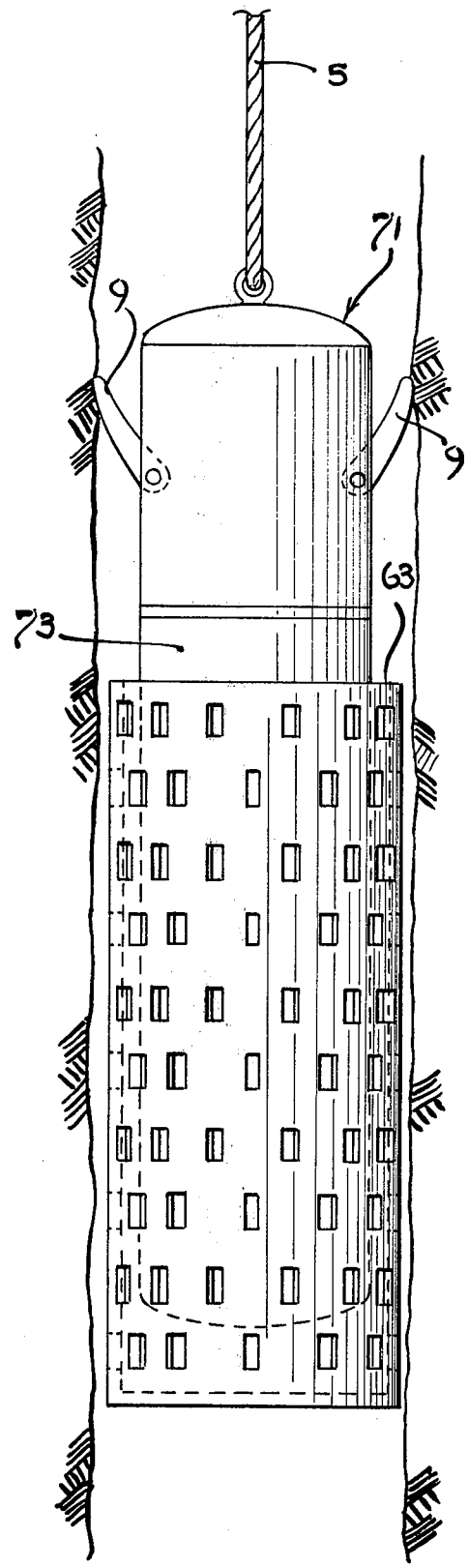

DEVICE FOR PROVIDING A REINFORCED FOAM LINING FOR WELL BORE HOLES

BACKGROUND OF THE INVENTION

1. Field of the Invention

The present invention relates generally to the sealing off of well bores in wells such as geothermal, water or oil wells where it is necessary to provide a stronger lining than can be obtained with rigid foam alone without pumping concrete or similar materials into the well. If there is difficulty in cementing off due to saltwater or an underground stream, a foam forming mixture reacts and hardens in minutes whereas concrete takes a longer time and may wash away in the process.

2. Description of the Prior Art

Many methods and devices for plugging and lining well bores under different circumstances and for different purposes have proposed to solve this problem. Examples include this inventor's U.S. Pat. No. 3,726,340 dated Apr. 10, 1973 and this inventor's co-pending U.S. patent application Ser. No. 127,585 filed Mar. 6, 1980, and now U.S. Pat. No. 4,276,934. This is another solution to the problem and provides a high-strength, rigid lining without the necessity of, and the complexity and delay associated with pumping concrete into a well and waiting for it to harden and cure. The present invention discloses a device and method for lining the well bore hole with a reinforced polyurethane or other type of foam which is generated in place.

SUMMARY OF THE INVENTION

A length of perforated pipe may be lowered to the desired depth in a well bore hole. A foam generating device may then be lowered inside the perforated pipe so that the foam, when generated, may flow through the perforations. The foam generating device may then be activated causing the foam components to mix well under pressure. Sufficient mixture of components under pressure may be produced and dispensed into the perforated pipe to force the mixture through the perforations in the pipe, filling the voids between the perforated pipe and the sides of the well bore. The component mixing device may then be removed. The mixture then reacts, swells, and hardens in the length of perforated pipe and adjacent voids. A drill may then be passed through the hardened foam within the length of perforated pipe leaving a rigid, reinforced, hollow cylinder of foam.

The component mixing device or foam generating device may be a cylindrical housing containing two chambers for storing the resin and catalyst under pressure, a mixing chamber, a battery or wire line operated motor driven motor and means for causing the resin and catalyst to be mixed and dispensed in a pre-timed sequence upon command from an input signal.

BRIEF DESCRIPTION OF THE DRAWING

FIG. 4 depicts the foam mixing and dispensing device and the perforated pipe in place in the well bore.

FIG. 5 depicts an alternate foam producing device in place in the well bore.

DETAILED DESCRIPTION

Figure 1:
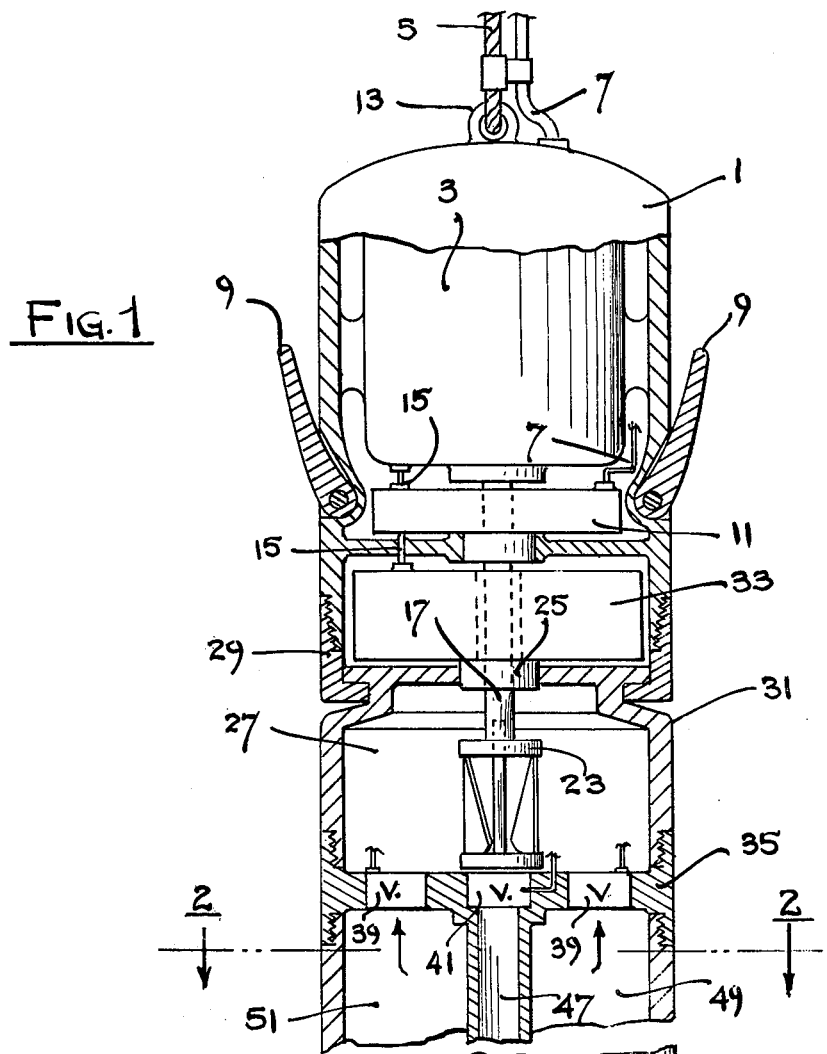
FIG. 1 depicts the foam mixing and dispensing device in partial section.
Figure 3:
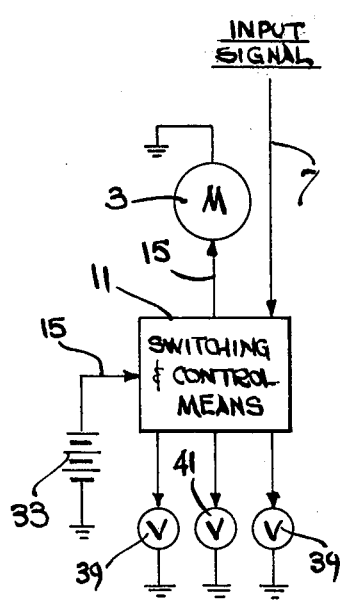
FIG. 3 is a schematic representation of the electrical interconnections.

The mixing and dispensing device of the present invention may be described by reference to FIG. 1. An upper housing 1 contains an electric motor 3 and motor control and switching means 11. A cable 5 (not part of the present invention) for raising and lowering the device is attached to the top of the upper housing by connecting means 13. Electrical control signal means 7 pass through the top of the upper housing to the motor control and switching means 11. The electric control signal means 7 can be any of the commonly known means such as; a loop antenna or wave guide for receiving radio signals connected by a conductor to the motor control and switching means 11, or an electrical cable mechanically secured to parallel cable 5. Electrical interconnecting means 15 allow appropriate electrical signals and power to flow between the motor control and switching means 11, the motor 3, and the battery pack 33. Appropriate electrical signals and power includes selection of power source between motor 3 and battery pack 33. FIG. 3 schematically depicts the interconnection of the electrical portions of the device. Pivotally attached to the outside of the upper housing 1 are a number of levers or dogs 9 so arranged as to pivot outwardly from the upper housing 1 and slide along the well bore surface as the device is being lowered. The dogs embed themselves into the well bore surface when the device is raised, thus anchoring the device in place in the well bore hole. As the foam mixing and dispensing device is reuseable, these dogs 9 must be strong enough to anchor the device upon a relatively small upward movement of the device, but weak enough to fracture when sufficient force is applied through cable 5 to raise the device to the surface.

A middle housing 31 is removably attached to the upper housing 1 by a collar 29. Within the inner chamber 27 of the middle housing 31 a mixer 23 is located so as to be rotatable under urging from motor shaft 17. A pressure seal bearing 25 surrounding motor shaft 17 seals the inner chamber 27 from the upper housing.

A divider plate 35 is removably attached to middle housing 31. Located in apertures in the divider plate 35 are three electrically actuated valves. The output valve 41 is located in the center of driver plate 35 so installed that fluids may flow out of inner chamber 27 when the valve 41 is open. Two input valves 39 are located on opposite sides of output valve 41 approximately halfway between the center and the circumference of divider plate 35. Each input valve 39 is so installed that fluids may flow into inner chamber 27 when the valve 39 is open. Electrical conducting means 15 allow signals for controlling each valve 39, 41 to be transmitted from the motor control and switching means 11 to the valve 39,41.

Figure 2:
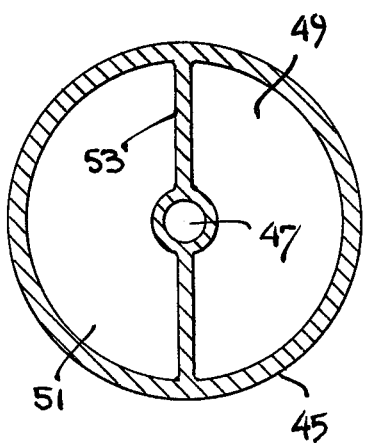
FIG. 2 depicts a cross section of the foam mixing and dispensing device.

A lower housing 45 is removably attached to the divider plate 35. As may be seen in FIG. 2, a divider 53 separates the interior of lower housing 45 into two cavities 49,51. A bore 47 is located in divider 53 running the entire length of divider 53 along the longitudinal axis of lower housing 45. When housing 45 is attached to divider plate 35, each cavity 49,51 forms a pressure vessel operably connectable to inner chamber 27 by means of an input valve 39. Similarly, inner chamber 27 is operably connectable to the exterior of the foam mixing and dispensing device through bore 47 by means of output valve 41.

In use, one cavity 49 is filled with a resin under pressure. The other cavity 51 is filled with a catalyst under pressure. When foam is required, an appropriate signal is transmitted through electrical signal means 7 causing the motor to be energized and both input valves 39 to be opened. Resin and catalyst flow through input valves 39 into inner chamber 27 where they are mixed under pressure by rotating mixer 23. A predetermined time later, output valve 41 is opened allowing the mixture to exit the mixing and dispensing device through bore 47.

In FIG. 4 the entire mixing and dispensing device (hereinafter referred to as "device") is identified as 61. FIG. 4 demonstrates the use of the device to line a well bore, such as a geothermal well, with reinforced foam. A length of perforated pipe 63 is placed within the well bore at the location to be lined. A multitude of perforations 67 are dispersed over the entire pipe wall. The device 61 is lowered a suitable distance into the length of perporated pipe and then raised slightly, causing the device 61 to be anchored in place by operation of the dogs 9. Alternatively, the device 61 and the length of perforated pipe 63 may be preassembled in their proper relative positions prior to being lowered into the well bore. The combination of the device 61 and the perforated pipe 63 may then be lowered to the location to be lined. When utilizing this alternative, the means (not part of this invention) maintaining the proper relative position between the device 61 and the perforated pipe 63 must be so constructed as to release the device 61 from the perforated pipe 63 when it is desired to raise the device after the mixed components have been dispensed.

The device 61 is then operated as described above causing the mixed components under pressure 65 to flow from the bottom of device 61, filling perforated pipe 63, and being forced through perforations 67 into the space between perforated pipe 63 and the sides of the well bore. The device 61 may then be withdrawn. Then the mixed components swell forming a foam, harden, and the entire pipe is encased in foam, inside and out. A drill (not part of the present invention) may then be passed down the well bore through the foam 65 inside the perforated pipe 63 leaving a cylinder, open at both ends, comprising the perforated pipe encased in foam, as a liner in the desired portion of the well bore.

This method of lining well bores with reinforced foam may be accomplished utilizing other foam generating devices. FIG. 5 demonstrates the use of a frangible foam generating capsule such as is disclosed in U.S. Pat. No. 3,726,340 by the present inventor. The perforated pipe 63 is placed within the well bore as described above. The foam generating device comprises two portions; an upper reuseable portion 71 containing the motor and dogs 9, and a lower, frangible portion 73. The device is lowered until the lower portion 73 is entirely within the perforated pipe 63 and then raised only enough to allow the dogs 9 to engage the well bore walls anchoring the device. The device is then activated, mixing the two components and producing sufficient pressure to fracture the frangible portion 73. The mixed components fill the perforated pipe 63 and are forced through the perforations 67. The upper portion 71 is then removed. The two components then react and swell causing the perforated pipe 63 to be encased in foam as is described above. The center of the foam filled perforated pipe may then be drilled out in the same manner as described earlier.

Those skilled in the art will recognize that many variations of the above may be effected within the disclosed invention.

I claim:

1. A device for mixing and dispensing foam components such as polyurethane foam components under pressure comprising:

an elongated cylindrical enclosure having at least three housings detachably arranged in coaxial end-to-end relationship and having an overall configuration capable of being lowered into a well bore;

a selected one of said housings disposed between the other two housings of said enclosure includes a mixing chamber containing an operable mixer;

one of said housings of said other two housings constituting a pair of pressure vessels enclosing a pair of pressurized storage chambers for storing fluids therein under pressure;

two operable valves, one located between the first of said pair of storage chambers and said mixing chamber and the other located between the second of said pair of storage chambers and said mixing chamber and each of said valves so oriented that fluid can flow from the adjacent storage chamber into said mixing chamber when the operable valve is in the open position;

said pressure vessel housing having a bore extending from said mixing chamber to the exterior of said enclosure at the extreme end of said pressure vessel housing;

operable valve means allowing mixed components to flow from said mixing chamber exteriorly of said enclosure via said bore;

said other or remaining housing of said three housings mounting an electric power source operably coupled to said mixer;

switching and control means coupled to said electric power source, said fluid valve means and said mixer component valve means for operably controlling in a predetermined sequence; and actuating means initiating the operation of said switching and control means when desired.

2. The device of claim 1 wherein said switching and control means comprises a timing mechanism whose timing sequence may be initiated by an input signal and containing switching means so programmed that electrical energy will be connected from said battery in the following sequence at predetermined time intervals:

(a) open said operable fluid valve means,
(b) energize said electric motor causing said bladed mixer to rotate, and
(c) open said operable mixed component valve means.

* * * * *